Patented Sept. 7, 1948

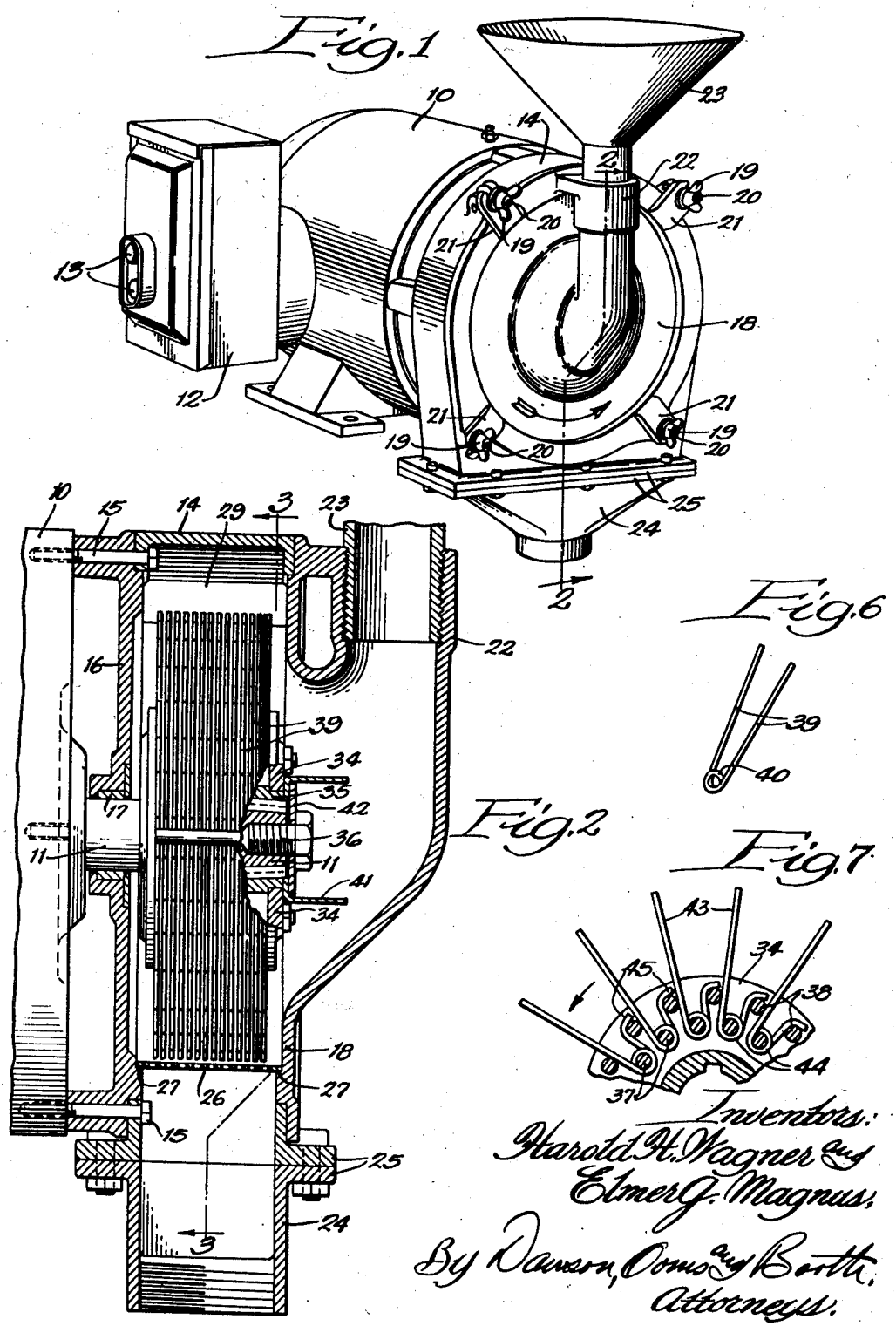

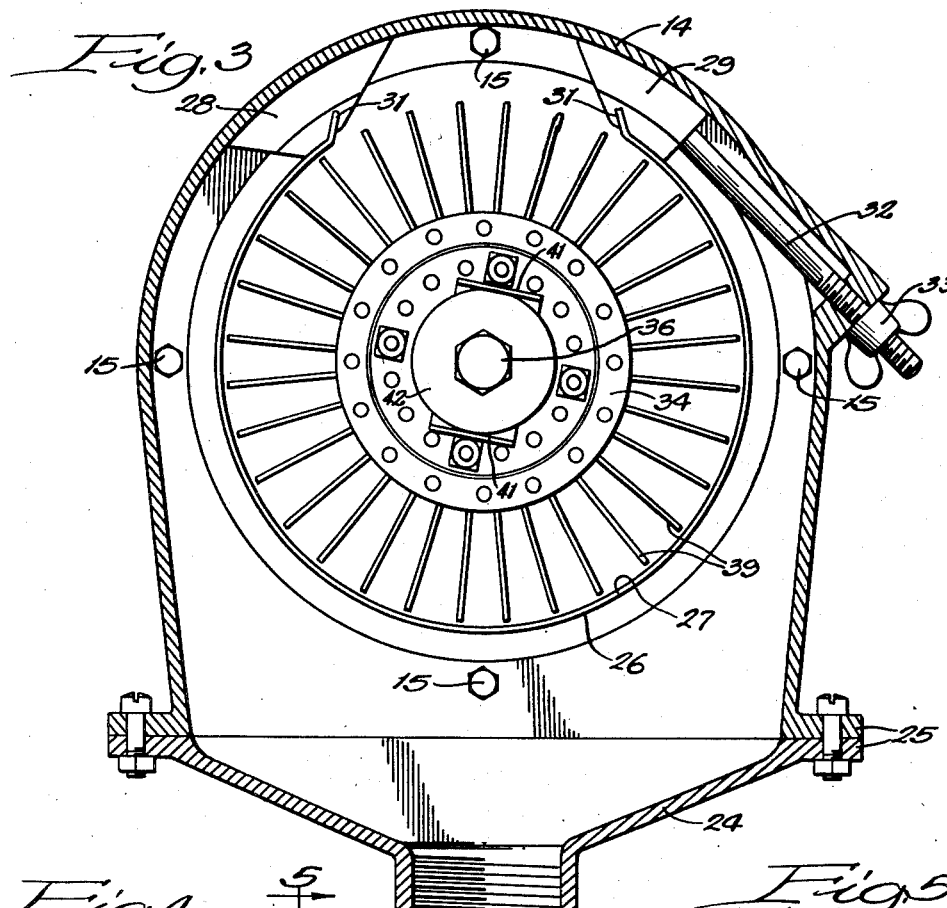
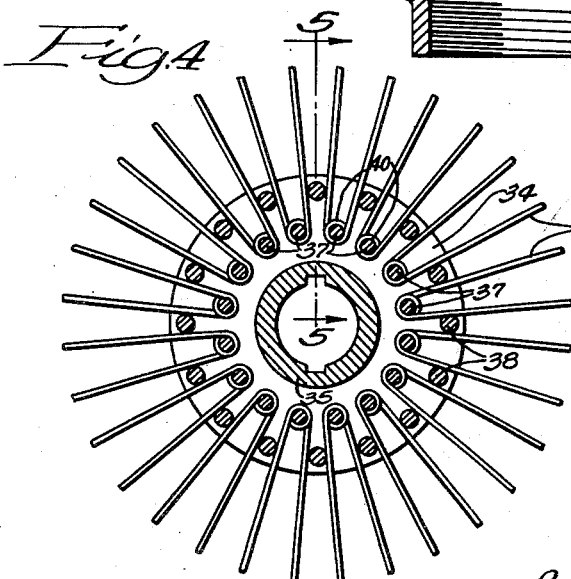
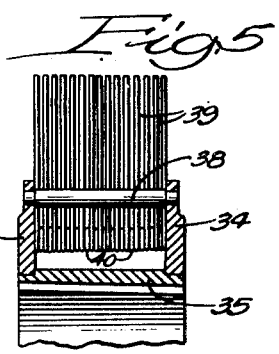

2,448,849

UNITED STATES PATENT OFFICE 2,448,849

ROTOR CONSTRUCTION FOR COMMINUTING AND MIXING MACHINES

Harold H. Wagner, Cincinnati, Ohio, and Elmer G. Magnus, Chicago, Ill., assignors to The W. J. Fitzpatrick Company, Chicago, Ill., a corporation of Illinois Application December 15, 1943, Serial No. 514,346

3 Claims. (Cl. 241—191)

1

This invention relates to rotor constructions for comminuting and mixing machines and more particularly to a relatively small self contained machine for performing a wide variety of comminuting and mixing operations.

An object of the invention is to provide a comminuting and mixing machine in which the rotor is formed by a hub from which a plurality of substantially cylindrical pins extend radially. The invention provides a relatively simple construction for forming such a rotor and for forming and mounting the pins thereon.

The above and other objects and advantages of the invention will be more readily apparent from the following detailed description when read in connection with the accompanying drawings, in which—

Figure 1 is a perspective view of a machine embodying the invention;

Figure 2 is an enlarged section on the line 2—2 of Figure 1 with parts of the rotor in elevation;

Figure 3 is a section on the line 3—3 of Figure 2;

Figure 4 is a transverse section centrally through the rotor;

Figure 5 is a section on the line 5—5 of Figure 4;

Figure 6 is a perspective of one of the pins; and

Figure 7 is a partial section similar to Figure 4 showing another form of pins.

The unit as shown in Figure 1 comprises an electric motor 10 and a substantially cylindrical body with a shaft 11 projecting from one end thereof. The motor may be mounted on any suitable base or standard not shown and preferably carries a starting switch 12 and start and stop buttons 13.

To one end of the motor there is rigidly attached an open ended substantially cylindrical casing 14 shown secured to the motor body by machine screws 15 rigidly to secure the casing to the motor. An end plate 16 is secured to one end of the casing by the screws 15 and is formed with a circular opening through which the motor shaft 11 extends. Preferably packing material as indicated at 17 is secured in the plate around the motor shaft to prevent leakage.

The opposite side of the casing is closed by a plate 18 secured to the casing by wing nuts 19 fastened to hinged bolts 20 hinged between projecting ears on the casing periphery. The bolts 20 are adapted to swing into open ended slots formed in lugs 21 on the cover plate 18, so that it can be quickly removed from the casing when desired.

The end plate 20 is formed with a central inlet opening communicating axially with the central part of the casing and having an upwardly extending pipe or conduit portion 22 to which a funnel or feed pan 23 may be added for supplying material to the machine. Treated material flows from the machine through its open bottom portion to which an outlet funnel 24 is attached. The casing and funnel 24 are preferably formed with outwardly extending flanges 25 adapted to be bolted together and which provide a smooth projecting rim over which a bag may be fitted to receive treated material. In some cases a bag may be used as described, while in others a container may be fitted over or attached to the outwardly extending opening on the outlet funnel 24.

A curved screen 26 is mounted in the casing and may be formed with perforations of any desired size to regulate the size of the material discharged through the outlet opening. The screen 26 is supported on annular shoulders 27 formed in the opposite ends of the casing and has its ends connected to blocks 28 and 29 carried at the periphery of the casing. One of the blocks shown as 28 is fixedly secured in the casing and is provided with a slot 31 to receive one end of the screen 26. The other block 29 is formed with a similar slot 31 to receive the opposite end of the screen and is carried by a rod 32 extending tangentially through the casing and threaded to receive a wing nut 33.

In mounting a screen in the casing the end plate 18 is removed and the ends of the screen are fitted into the slots 31 with the opposite edges of the screen fitting against the shoulders 27. After the end plate 18 has been placed back on the casing the wing nut 33 may be tightened to spread the ends of the screen apart, so that it will be forced against the shoulders 27 and will be held tightly in place in the casing. Since the shoulders 27 determine the position of the screen, it will be seen that the screens will be accurately located in the casing regardless of slight variations in the dimensions thereof, and that the edges of the screen will be held tightly against the casing at all times.

Within the screen and on the motor shaft 11 is mounted a rotor shown as formed by a pair of end plates 34 supported on a shouldered sleeve 35, which is adapted to be keyed to the shaft and held in place thereon by a bolt 36 threaded into the shaft end. The end plates 34 are connected by a series of circumferentially spaced bars 37, some of which may be in the form of bolts to hold the end plates 34 on the sleeve 35. A second series of circumferentially spaced bars 38 is provided spaced radially outward from the bars 37 and staggered with respect thereto. A series of substantially cylindrical pins is mounted on the rotor, the pins being formed as shown in Fig. 6 of lengths of thin metal strip or wire 39 looped in their central portions as indicated at 40, with the ends extending in the same general direction. The looped portions 40 of the wires fit over the inner series of bars 37 in the hub and the ends extend between adjacent bars 38 to hold the end portions of the wires properly spaced so they will extend substantially radially outward from the hub axis.

The wires are preferably of relatively small diameter and possess a certain amount of flexibility. We have found that for a rotor having an external diameter of about 7" stainless steel wires of approximately ⅛" diameter give excellent results. For some purposes where greater flexibility of the wires is especially advantageous a construction such as shown in Figure 7 is preferred. In this construction the wires are formed with one long leg 43 with a loop portion 44 fitting around the pins 37. The opposite leg of the wire is short and is turned over at its end to hook over one of the pins 38. With the rotor turning in the direction of the arrow, the legs 43 of the wire which form the only operating parts thereof resiliently engage material in the casing. This construction also enables the wires to yield under impact against the material being treated so that they will not be bent or broken easily and will not tend to crystallize during operation.

With a machine of this character having a rotor constructed as described and operating at a speed of approximately 3500 R. P. M. materials of various different types can be efficiently comminuted or mixed. One advantage of this construction is that it incorporates very little air into the mixture during the treating operations, and even with relatively thick materials does not entrap any air therein.

For using the machine with materials which may contain relatively large lumps or for relatively plastic materials, a breaker or feeder strip may be provided secured in place by the fastening screw 36 as shown at 41 in Figure 2. The feeder strip may be formed of a substantially rectangular strip of sheet metal bent over at its ends and held under a washer 42 by the fastening screw 36. When this strip is employed any lumps in material fed into the machine will be broken up by engagement with the projecting ends of the strip so that the material will flow readily into the rotor. With relatively plastic materials, we have found that the use of this strip increases the feed rate.

Machines of the type described have been found to be extremely efficient in the formation of emulsions such as stable emulsions of the oil and water type in which use they are capable of producing results as good as or better than machines of the type heretofore used several times their size. They are also very effective for the preparation of colloidal suspension and in the milling or mixing of ointments of various types. In addition, they may be used effectively for granulation and other types of comminuting operations.

In addition to the above uses various others will occur to those skilled in the art, and we do not desire to limit the scope of our invention to the particular uses indicated nor to the exact construction shown in the drawings, reference being had to the appended claims to determine the scope of the invention.

What is claimed is:

1. A comminuting and mixing machine comprising a substantially cylindrical casing and a rotor in the casing, the rotor including a central hub formed by a pair of end plates, two circumferentially spaced series of bars between the end plates spaced radially apart, and a series of wires with their central portions looped around the bars of the inner series and their ends extending substantially radially outward between the bars of the outer series.

2. In a comminuting and mixing machine, a substantially cylindrical casing and a rotor in the casing, the rotor comprising a central hub formed by a pair of axially spaced end plates connected by radially and circumferentially spaced bars, the inner bars registering radially with open spaces between adjacent outer bars and a series of elongated resilient strips with their central portions looped around radially inner ones of the bars and their ends extending outwardly between and in engagement respectively with adjacent radially outer bars.

3. In a comminuting and mixing machine, a substantially cylindrical casing and a rotor in the casing, the rotor comprising a central hub formed by a pair of axially spaced end plates connected by radially and circumferentially spaced bars, the inner bars registering radially with open spaces between adjacent outer bars and a series of elongated resilient strips with their central portions looped around radially inner ones of the bars and their ends extending outwardly between and in engagement respectively with adjacent radially outer bars, one end of each of the strips terminating adjacent and being hooked over one of the radially outer bars.

HAROLD H. WAGNER.
ELMER G. MAGNUS.

REFERENCES CITED

The following references are of record in the file of this patent:

UNITED STATES PATENTS

| Number | Name | Date |
|---|---|---|
| 743,195 | Remmele | Nov. 3, 1903 |
| 780,729 | Rief | Jan. 24, 1905 |
| 791,328 | Davenport | May 30, 1905 |
| 987,828 | Schenck | Mar. 28, 1911 |
| 1,027,163 | Werner | May 21, 1912 |
| 1,158,248 | Livermon | Oct. 26, 1915 |
| 1,275,346 | Williams | Aug. 13, 1918 |
| 1,403,013 | Cornwall | Jan. 10, 1922 |
| 1,711,464 | Ruprecht | Apr. 30, 1929 |
| 1,748,046 | Bullock | Feb. 18, 1930 |
| 1,816,050 | Lee | July 28, 1931 |
| 2,044,531 | Kaspar | June 16, 1936 |
| 2,052,718 | Maiers | Sept. 1, 1936 |
| 2,118,309 | Johnson | May 24, 1938 |
| 2,128,727 | Elderkin | Aug. 30, 1938 |
| 2,271,794 | Day et al. | Feb. 3, 1942 |
| 2,321,082 | Harshberger | June 8, 1943 |
| 2,330,969 | Harries | Oct. 5, 1943 |

FOREIGN PATENTS

| Number | Country | Date |
|---|---|---|
| 223,718 | Great Britain | Oct. 30, 1924 |